US009042253B2

(12) United States Patent
Andrews et al.

(10) Patent No.: US 9,042,253 B2
(45) Date of Patent: May 26, 2015

(54) RESOURCE ALLOCATION IN HETEROGENEOUS LTE NETWORKS VIA CSMA-BASED ALGORITHMS

(71) Applicant: Alcatel-Lucent USA Inc., Murray Hill, NJ (US)

(72) Inventors: Daniel Andrews, Chatham, NJ (US); Yihao Zhang, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 213 days.

(21) Appl. No.: 13/729,790

(22) Filed: Dec. 28, 2012

(65) Prior Publication Data

US 2014/0086198 A1 Mar. 27, 2014

Related U.S. Application Data

(60) Provisional application No. 61/704,678, filed on Sep. 24, 2012.

(51) Int. Cl.
*H04B 7/00* (2006.01)
*H04W 72/08* (2009.01)
*H04W 72/12* (2009.01)
*H04L 5/00* (2006.01)
*H04J 11/00* (2006.01)

(52) U.S. Cl.
CPC ........... *H04W 72/082* (2013.01); *H04L 5/0073* (2013.01); *H04J 11/005* (2013.01); *H04W 72/1236* (2013.01); *H04W 72/1289* (2013.01)

(58) Field of Classification Search
CPC .............................. H04J 11/005; H04L 5/0073
USPC .................................................. 370/252, 328
See application file for complete search history.

(56) References Cited

U.S. PATENT DOCUMENTS

| 6,411,819 | B1 * | 6/2002 | Gutowski | 455/525 |
|---|---|---|---|---|
| 7,170,876 | B2 * | 1/2007 | Wei et al. | 370/335 |
| 7,301,955 | B1 * | 11/2007 | Tryfonas et al. | 370/412 |
| 8,750,254 | B2 * | 6/2014 | Mosko et al. | 370/335 |
| 8,811,198 | B2 * | 8/2014 | Bhushan et al. | 370/252 |
| 2003/0204615 | A1 * | 10/2003 | Wei et al. | 709/232 |
| 2007/0149242 | A1 * | 6/2007 | Kim et al. | 455/525 |
| 2009/0005030 | A1 * | 1/2009 | Han et al. | 455/423 |
| 2009/0109939 | A1 * | 4/2009 | Bhushan et al. | 370/337 |
| 2012/0008511 | A1 * | 1/2012 | Fan et al. | 370/252 |
| 2012/0269143 | A1 * | 10/2012 | Bertrand et al. | 370/329 |
| 2012/0329498 | A1 * | 12/2012 | Koo et al. | 455/501 |
| 2013/0295921 | A1 * | 11/2013 | Bhargava et al. | 455/426.1 |
| 2013/0322396 | A1 * | 12/2013 | Jiang et al. | 370/329 |
| 2013/0336274 | A1 * | 12/2013 | Simonsson et al. | 370/329 |

* cited by examiner

Primary Examiner — Jay P Patel
(74) Attorney, Agent, or Firm — Harness, Dickey & Pierce, P.L.C.

(57) ABSTRACT

In one embodiment, the method includes determining feasibility for a potential transmission based on a current schedule of active transmissions. The current schedule of active transmissions includes active transmissions over multiple carriers and at multiple transmission rates. The potential transmission is at a start time on a radio frequency carrier at a data transmission rate by a user terminal. A transmission duration is determined if the potential transmission is determined to be feasible. A message is sent to the user terminal. if the potential transmission is determined to be feasible. The message may direct the user terminal to receive the potential transmission on the radio frequency carrier at the data transmission rate at the start time. The current schedule is updated according to the feasibility determination.

16 Claims, 2 Drawing Sheets

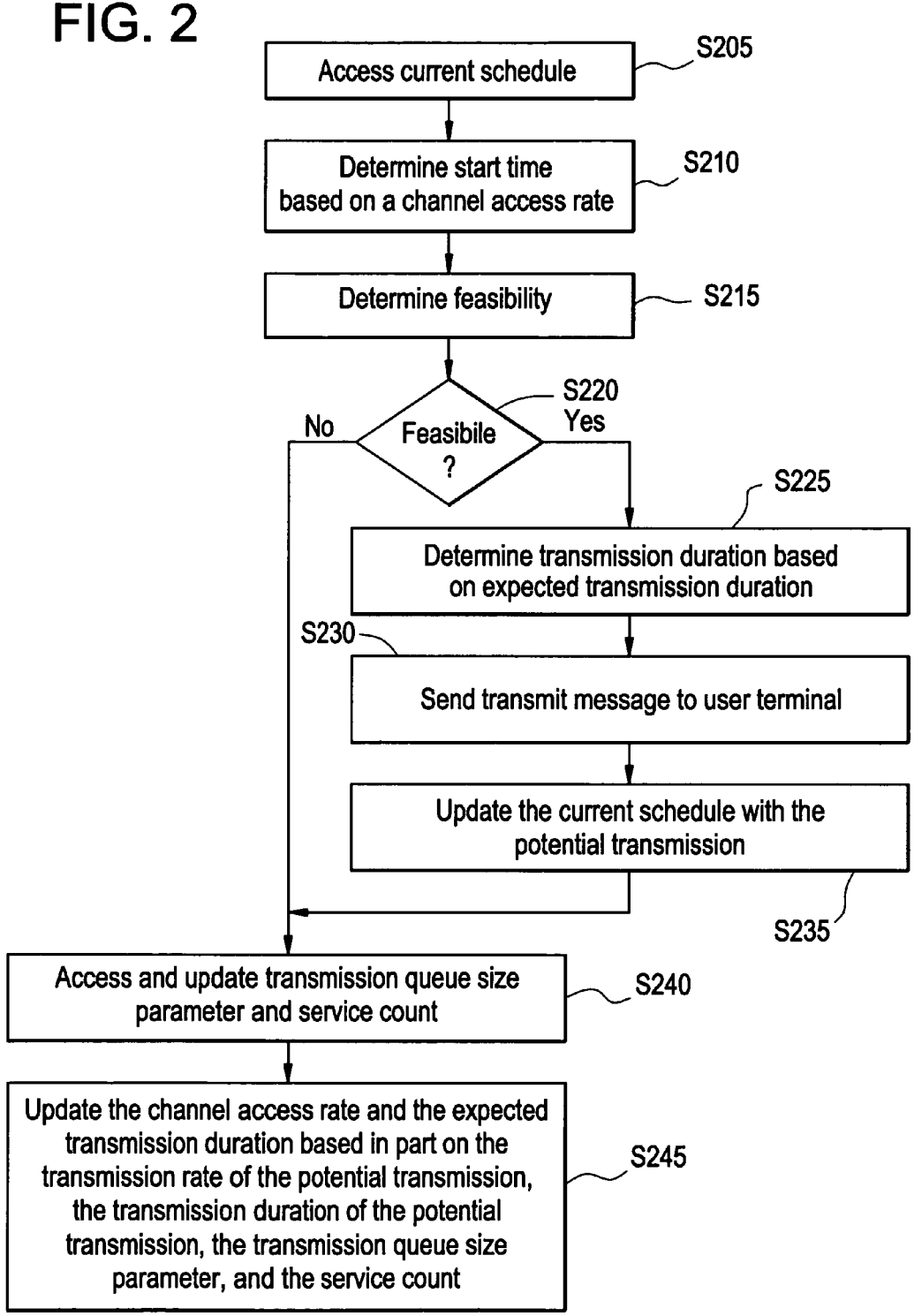

RESOURCE ALLOCATION IN HETEROGENEOUS LTE NETWORKS VIA CSMA-BASED ALGORITHMS

PRIORITY STATEMENT

This non-provisional patent application claims priority under 35 U.S.C. §119(e) to provisional patent application No. 61/704,678, filed on, Sep. 24, 2012, the entire contents of which are incorporated herein by reference.

BACKGROUND OF THE INVENTION

As wireless communication systems proliferate worldwide, complicated signal environments are bound to occur, which may cause signal interference to increase. Thus, there is often a need to provide interference mitigation in wireless networks.

Current methods for handling interference in wireless networks depend on the specific attributes of the network. For traditional cellular networks, interference mitigation techniques include power-control, frequency reuse, and fine-grained rate control based on channel-quality measurements. Additionally, cellular networks often require some aspect of central planning in order to effectively apply the aforementioned techniques. For ad-hoc networks, especially those running the 802.11 protocol, interference is typically mitigated using a distributed collision-based random access scheme. These collision-based random access schemes may be coupled with a coarse-grained rate-adaptation procedure.

However, it is difficult to mitigate interference in cellular systems with distributed components, such as heterogeneous 4G LTE (also known as Long Term Evolution) cellular network systems that also include smallcells. In this context, smallcells may be base stations that aim to provide high data rate coverage over a small high-traffic area. Examples of smallcells include picocells and femtocells.

Picocells are small cellular base stations that are typically used to extend coverage to indoor areas with weak outdoor signal coverage, or to add network capacity to indoor areas with very dense phone usage. Picocells are often placed inside buildings (e.g., offices, shopping centers, train stations, and the like) or inside aircraft. In many cases, picocells are owned by a cellular provider and placed in public locations. Alternatively, femtocells are low power cellular base stations that are typically owned by a private entity with the aim of improving coverage in a private location, such as a home or business. Because femtocells are often used by private entities, they can operate in Closed Subscriber Group (CSG) mode, where the base station restricts the set of mobile terminals that can connect to the femtocell.

Furthermore, smallcells may cause interference with user terminals that are operating in a macrocell. A macrocell is a cell in a mobile phone network that provides radio coverage served by a high power cellular base station. Interference to macrocell users may come from neighboring smallcells, or from smallcells that operate in the interior of the macrocell.

However, traditional interference mitigation techniques are difficult to implement because LTE networks with smallcells represent a hybrid of traditional cellular networks and traditional ad-hoc networks. On the one hand, base stations run LTE protocols that may provide for one or more interference mitigation schemes. On the other hand, the placement of smallcells in an LTE network is likely to be unstructured and so the interference configurations are likely to resemble a typical ad-hoc configuration. As a consequence, centralized planning of the placement of smallcells is unlikely.

Prior interference mitigation techniques mainly fall into two categories, resource allocation in orthogonal frequency-division multiplexing (OFDM) systems and Carrier Sense Multiple Access (CSMA) based algorithms for 802.11 networks.

Resource allocation in OFDM systems addresses problems such as channel selection, local scheduling, power control and user association (i.e. which base station serves which user). One popular technique is a Gibbs sampler approach based on Interacting Particle Systems. The premise of the Gibbs sampler approach is that for a given network configuration each node has a local energy based on the interference that it both causes and receives. Nodes then pick new states based on their local energy. Gibbs sampler techniques have also been used to motivate greedy algorithms for LTE carrier selection. Another popular OFDM technique is to set power levels according to a gradient ascent approach. In particular, each transmitter adjusts power levels so as to improve network utility in its neighborhood. Both the Gibbs sampler and the gradient ascent methods require information exchange on how much interference each transmitter causes to each receiver. For the Gibbs sampler methods, interference information needs to be exchanged in order to calculate local energy levels. For the gradient ascent methods, nodes need to exchange "partial derivative" information to indicate how the interference they experience would be affected by a change in a neighbor's power levels.

In CSMA networks, all user terminals wish to access a single channel. To achieve this end, a transmitter tries to detect the presence of an encoded signal from another station before attempting to transmit. If a carrier is sensed, the station waits for the transmission in progress to finish before initiating its own transmission. However, most CSMA interference mitigation techniques require channel access rates that depend on local queue sizes in order to keep the system stable.

SUMMARY

Example embodiments provide systems and/or methods for scheduling user terminal transmissions by a base station.

According to an example embodiment, a method of scheduling user terminal transmissions by a base station includes determining feasibility for a potential transmission based on a current schedule of active transmissions. The current schedule of active transmissions includes active transmissions over multiple carriers and at multiple transmission rates. The potential transmission is at a start time on a radio frequency carrier at a data transmission rate to a user terminal. A transmission duration is determined if the potential transmission is determined to be feasible. A message is sent to the user terminal; if the potential transmission is determined to be feasible, the message may direct the user terminal to receive the potential transmission on the radio frequency carrier at the data transmission rate at the start time. However, if the potential transmission is determined to be infeasible, the message may direct the user terminal to not receive the potential transmission on the radio frequency carrier at the data transmission rate at the start time. The current schedule is updated according to the feasibility determination.

In one example embodiment, determining feasibility may include sensing downlink transmissions from at least one other base station. The base station may decide if the downlink transmission from the at least one other base station will be a source of interference with the potential transmission. The potential transmission may be infeasible if the downlink transmission from the at least one other base station is determined to be a source of interference with the potential transmission.

According to another example embodiment, deciding that a downlink transmission from the at least one other base station is a source of interference may include determining if the downlink transmission from the at least one other base station is scheduled to transmit on the same radio frequency carrier during the same time frame and an estimate based on a channel quality information (CQI) indicates that expected interference will exceed a threshold.

According to another example embodiment, determining feasibility may also include transmitting a probe at a desired power level for the potential transmission to the user terminal. The base station may receive information from neighboring cells that is indicative of interference caused by the probe. The transmission by the user terminal may be determined to be infeasible if the received information indicates the interference caused by the probe exceeds a threshold.

According to another example embodiment, the desired power level may be a transmission power required to transmit the potential transmission, where the required transmission power is based on the data transmission rate of the potential transmission and the CQI.

According to another example embodiment, the start time of the potential transmission may be based on a channel access rate and the transmission duration may be based on an expected transmission duration.

According to another example embodiment, the start time may be determined by choosing a random number from an exponential distribution of the channel access rate and the transmission duration may be determined by choosing a random number from an exponential distribution of an inverse of the expected transmission duration.

According to another example embodiment, updating the current schedule may include accessing a transmission queue size parameter and a service count, where the service count indicates a service received by the user terminal. The channel access rate and the expected transmission duration may be based in part on the channel access rate of the potential transmission, the transmission rate of the potential transmission, the received transmission queue size parameter, and the received service count.

Another example embodiment provides a base station configured to determine feasibility for a potential transmission according to the request based on a current schedule of active transmissions. The current schedule of active transmissions includes active transmissions over multiple carriers and at multiple transmission rates. The potential transmission is at a start time on a radio frequency carrier at a data transmission rate to a user terminal. The base station may be configured to determine a transmission duration if the potential transmission is determined to be feasible. The transmission duration is based on an expected transmission duration. The base station may be configured to send a message to the user terminal. The message may direct the user terminal to receive the potential transmission on the radio frequency carrier at the data transmission rate at the start time if the potential transmission is determined to be feasible. Or the message may direct the user terminal to not receive the potential transmission on the radio frequency carrier at the data transmission rate at the start time if the potential transmission is determined to be infeasible. And, the base station may be configured to update the current schedule according to the feasibility determination.

In one example embodiment, the base station may determine feasibility by sensing downlink transmissions from at least one other base station. The base station may decide if the downlink transmission from the at least one other base station will be a source of interference with the potential transmission. The base station may determine that the potential transmission is infeasible if it is decided that the downlink transmission from the at least one other base station will be a source of interference with the potential transmission.

According to another example embodiment, the base station may decide that a downlink transmission from the at least one other base station is a source of interference if the downlink transmission from the at least one other base station is scheduled to transmit on the same radio frequency carrier during the same time frame and an estimate based on a channel quality information (CQI) indicates that expected interference will exceed a threshold.

According to another example embodiment, the base station may determine feasibility by transmitting a probe at a desired power level for the potential transmission to the user terminal. The base station may receive information from neighboring cells that is indicative of interference caused by the probe. The base station may determine that the transmission by the user terminal is infeasible if the received information indicates the interference caused by the probe exceeds a threshold.

According to another example embodiment, the desired power level may be a transmission power required to transmit the potential transmission, the required transmission power being based on the data transmission rate of the potential transmission and the CQI.

According to another example embodiment, the start time may be based on a channel access rate and the transmission duration may be based on an expected transmission duration.

According to another example embodiment, the base station may be configured to determine the start time by choosing a random number from an exponential distribution with a mean that is equal to the channel access rate. The base station may also be configured to determine the transmission duration by choosing a random number from an exponential distribution with a mean equal to an inverse of the expected transmission duration.

According to another example embodiment, the base station may update the current schedule by accessing a transmission queue size parameter and a service count, the service count may indicate a service received by the user terminal. The base station may update the channel access rate and the expected transmission duration based in part on the channel access rate of the potential transmission, the transmission rate of the potential transmission, the transmission queue size parameter, and the received service count.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 2 shows a multi-carrier multi-rate utility optimization (MMUO) method for allocating resources on a multicarrier system that allows for multiple data transmission rates on at least one radiofrequency carrier, according to an example embodiment.

DETAILED DESCRIPTION OF EXAMPLE EMBODIMENTS

Figure 1:
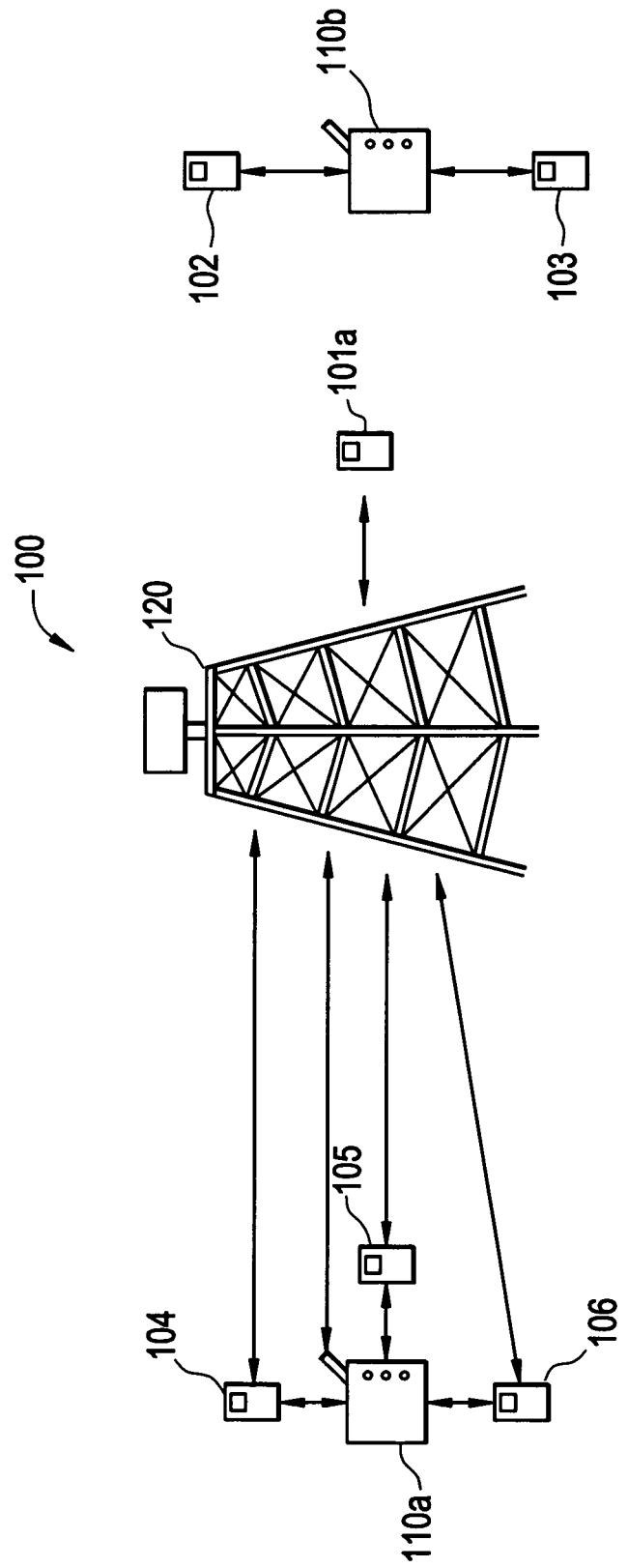
FIG. 1 illustrates an example of a communications network with distributed components, according to an example embodiment.

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "buffer" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels and various other mediums capable of storing, containing or carrying instruction(s) and/or data including non-transitory storage media.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "user terminal" may be considered synonymous to, and may hereafter be occasionally referred to, as a client, mobile, mobile unit, mobile station, mobile user, user equipment (UE), subscriber, user, remote station, access terminal, user terminal, receiver, etc., and may describe a remote user of wireless resources in a wireless communication network.

As used herein, the term "base station", may be considered synonymous to and/or referred to as an enhanced Node B (eNB), base transceiver station (BTS), NodeB, access point (AP), etc. and may describe equipment that provides the radio baseband functions for data and/or voice connectivity between a network and one or more users.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); $3^{rd}$ Generation Partnership Project LTE (3GPP LTE); and $4^{th}$ Generation LTE.

Example embodiments provide systems and methods for allocating or scheduling radiofrequency carriers and data transmission rates in cellular systems with distributed components such as heterogeneous LTE systems with microcells and femtocells or other like system configurations. Example embodiments may include determining feasibility of a potential transmission within an LTE system in the presence of one or more femtocells, picocells, microcells, or other like smallcells.

While some example embodiments are discussed with reference to femtocells, it should be understood that the example embodiments may be implemented using any smallcell such as picocells, or other like network elements.

FIG. 1 illustrates an example of a communications network with distributed components according to an example embodiment. A communications network 100 includes a user terminals 101-106, femtocell base stations 110a-b, and macrocell base station 120.

Each of the user terminals 101-106 may include a transceiver, memory, and processor. User terminals 101-106 may be configured to send/receive data to/from femtocell base stations 110a-b and macrocell base station 120. User terminals 101-106 may be designed to sequentially and automatically carry out a sequence of arithmetic or logical operations; equipped to record/store digital data on a machine readable medium; and transmit and receive digital data via femtocell base stations 110a-b and macrocell base station 120. User terminals 101-106 may include cellular phones, tablet personal computers, and/or any other physical or logical device capable of recording, storing, and/or transferring digital data via femtocell base stations 110a-b and macrocell base station 120. Each of the user terminals 101-106 may include a wireless transceiver configured to operate in accordance with the IEEE 802.11-2007 standard (802.11) or other like wireless standards.

Macrocell base station 120 may be configured to provide wireless communication services to user terminals within a geographic area, or cell coverage area, associated with the macrocell base station 120. For example, FIG. 1 shows user terminal 101 and user terminals 104-106 within a cell coverage area provided by macrocell base station 120, and thus able to provide wireless communication services to user terminals 101, 104-106 via a link for each user terminal. Links between macrocell base station 120 and each of the user terminals may include one or more downlink (or forward) channels for transmitting information from macrocell base station 120 to user terminals 101, 104-106 and one or more uplink (or reverse) channels for transmitting information from user terminals 101, 104-106 to the macrocell base station 120. As such, the cell coverage area provided by macrocell base station 120 may be a centrally controlled cellular network.

Macrocell base station 120 may include a processor and transmitter/receiver connected to one or more antennas and an electronic switching function. The one or more transmitters/receivers may be configured to transmit/receive data signals to/from one or more user terminals within its cell coverage area (e.g., user terminals 101, 104-106) via one or more links that may be associated with a transmitter and a receiver. Multiple links may share a common transmitter; however, each link corresponds to an associated receiver.

Macrocell base station 120 may be configured to employ one or more wireless communications standards, such as CDMA, GSM, LTE, WiMAX, or other like wireless communications standard. Macrocell base station 120 may also be configured to connect to a service provider's network via hard link, such as a packet switched network, a mobile switching center, or via other like connection means. The electronic switching function may be a "Mobile Switching Center" (MSC) when macrocell base station 120 employs a GSM, AMPTS, NMT and CDMA system. Alternatively, a "Media Gateway" (MGW)/"Gateway MSC Server" (GMSC) may be used if macrocell base station 120 employs a 3G/4G mobile system.

Macrocell base station 120 may be configured to operate a channel access method, such as code division multiple access (CDMA), orthogonal frequency-division multiple access (OFDMA), frequency division multiple access (FDMA), time division multiple access (TDMA), packet mode multiple-access, space division multiple access (SDMA), or other like channel access methods or combination thereof.

Additionally, any of the above mentioned channel access methods may be enhanced using a channel quality indicator (CQI), which is a value of the communication representing a measure of channel quality for a given channel. A CQI for a channel can be computed by making use of one or more performance metrics, such as a signal-to-noise ratio (SNR), signal-to-interference plus noise ratio (SINR), signal-to-noise plus distortion ratio (SNDR), and other like performance metrics. The CQI may also be based on other factors, such as performance impairments, channel estimation error, interference, and other like factors. These performance metrics and other factors can be measured for a given channel and then used to compute a CQI for the channel.

Macrocell base station 120 may also be configured to operate a scheduling algorithm, such as proportional fair, maximum throughput scheduling, or other like scheduling algorithms.

Macrocell base station 120 may be configured to operate a collision detection method, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance (CA) protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

Femtocells 110a-b may be configured as a low-power cellular base station and may have similar features as described above in regards to macrocell base station 120. Accordingly, femtocells 110a-b may be configured to provide wireless communication services to user terminals within a small geographic area, within a building, or other like smallcell coverage area, associated with the either one of femtocells 110a-b.

For example, FIG. 1 shows user terminals 104-106 within a smallcell coverage area provided by femtocell base station 110a, thus femtocell base station 110a is able to provide wireless communication services to user terminals 104-106 via a link for each user terminal. Similarly, FIG. 1 shows user terminals 102-103 within a smallcell coverage area provided by femtocell base station 110b, thus femtocell base station 110b is able to provide wireless communication services to user terminals 102-103 via a link for each user terminal. Links between femtocell base stations 110a-b and each of the user terminals may include one or more downlink (or forward) channels for transmitting information from, for example, femtocell base station 110a to user terminals 104-106 and one or more uplink (or reverse) channels for transmitting information from user terminals 104-106 to femtocell base station 110a.

Additionally, in various embodiments, either one of femtocells 110a-b may be configured to operate in Closed Subscriber Group (CSG) mode, in which the femtocell restricts the set of mobile terminals that can connect to it. According to such embodiments where a femtocell is configured in CSG mode, only those users included in the femtocell's access control list are allowed to use the femtocell resources. Alternatively, in various embodiments, either one of femtocells 110a-b may be configured to operate in Open Access mode, in which any user is allowed access to the femtocell.

Femtocell base stations 110a-b may include a processor and transmitter/receiver. The one or more transmitters/receivers may be configured to transmit/receive data signals to/from one or more user terminals within its smallcell coverage area (e.g., user terminals 104-106 within the smallcell coverage area of femtocell base station 110a) via one or more links that may be associated with a transmitter and a receiver. Multiple links may share a common transmitter; however, each link corresponds to an associated receiver.

Femtocell base stations 110a-b may be configured to employ one or more wireless communications standards, such as CDMA, WCDMA, GSM, WiMAX, LTE, or other like wireless communications standards. Additionally, Femtocells 110a-b may be configured to connect to a service provider's network via broadband (such as DSL or cable), or by using other like connection means. As such, the cell coverage areas provided by each one of femtocell base stations 110a-b may be an ad-hoc network.

Femtocell base stations 110a-b may be configured to operate a channel access method, such as code division multiple access (CDMA), orthogonal frequency-division multiple access (OFDMA), frequency division multiple access (FDMA), time division multiple access (TDMA), packet mode multiple-access, space division multiple access (SDMA), or other like channel access methods or combination thereof.

Additionally, any of the above mentioned channel access methods may be enhanced using a channel quality indicator (CQI), which may be a value of the communication representing a measure of channel quality for a given channel. A CQI for a channel can be computed by making use of performance metric, such as a signal-to-noise ratio (SNR), signal-to-interference plus noise ratio (SINR), signal-to-noise plus distortion ratio (SNDR), and other like performance metrics. The CQI may also be based on other factors, such as performance impairments, channel estimation error, interference, and other like factors. These performance metrics and other factors can be measured for a given channel and then used to compute a CQI for the channel.

Femtocell base stations 110a-b may also be configured to operate a scheduling algorithm, such as proportional fair, maximum throughput scheduling, or other like scheduling algorithms.

Femtocell base stations 110a-b may be configured to operate a collision detection method, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance (CA) protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

Additionally, because the coverage area of femtocells operate on a smaller scale than other base stations, femtocell stations may be placed in close proximity to, or within the coverage area of a macrocell base station. For example, FIG. 1 shows macrocell base station 120 servicing user terminals 101 and user terminals 104-106. Additionally, user terminals 104-106 are being serviced by femtocell base station 110a. In some instances, the coverage area of femtocell base station 110a may be within the coverage area of macrocell base station 120, thereby allowing both femtocell base station 110a and macrocell base station 120 to service user terminals 104-106. In other situations, the coverage area of femtocell base station 110a may not be within the coverage area of macrocell base station 120, but the coverage area femtocell base station 110a may border or be sufficiently close to the coverage area of macrocell base station 120. Thus, user terminals 104-106 are still in range of both femtocell base station 110a and macrocell base station 120, thereby allowing both femtocell base station 110a and macrocell base station 120 to service user terminals 104-106. However, in situations as described above, femtocell base station 110a may be a source of interference to macrocell base station 120.

FIG. 2 illustrates a multi-carrier multi-rate utility optimization (MMUO) method according to an example embodiment. The MMUO method may be used for allocating resources on a multicarrier system that allows for multiple data transmission rates on at least one radiofrequency carrier. A multicarrier system is one in which a set of transmitters communicate to a set of receivers via a set of links on a set of radiofrequency carriers ("carriers") at data transmission rates ("rates"). Each link may be associated with a transmitter and a receiver, where multiple links may share a common transmitter but each link corresponds to an associated receiver.

As shown in step S205, base station 120 accesses a current schedule of active transmissions. The current schedule may be created using a proportional fair (PF) algorithm or other like scheduling algorithms as known in the art. A scheduling algorithm describes a schedule for every carrier of a group of carriers at every time instant. It should be noted that a mobile terminal may be allowed to simultaneously transmit on multiple carriers such that the current schedule may specify, for a given time instant, the mobile terminals that are transmitting on each carrier together with associated transmission rates.

In various embodiments, the current schedule may define time frames having a fixed duration, where one or more potential transmissions are scheduled to transmit during each time frame f. In such embodiments, each potential transmission is scheduled to transmit on a link l at a data transmission rate r on a carrier c (denoted as potential transmission $\langle l, r, c \rangle$).

For reasons that will become apparent later, in the instance where two or more bordering or overlapping heterogeneous networks are involved, base station power allocation and interference may be addressed by the current schedule. For a base station i, let $U_i$ be a set of associated user terminals. $U_i$ may also denote a set of links that are incident to i as there may be a one-to-one correspondence between the user terminals and links. The maximum transmit power $p_i$ for base station i may be a fixed amount. In such embodiments, the resource allocation system and method determines how to distribute $p_i$ among a set of carriers c and among the user terminals in Ui (where $p_{i,c}$ is the power allocation of $p_i$ on carrier c). Thus, the current schedule may be configured to allocate $p_{i,c}$ to the next scheduled user terminal.

In typical LTE systems, each base station in an LTE network has its own local scheduler for user-level power allocation, therefore when dealing with multiple cells, the scheduling may occur at an inter-cell level. In such embodiments, the primary scheduling decision is to determine the power levels $p_{i,c}$, which is sometimes known as inter-cell interference coordination (ICIC). The secondary scheduling decision is to allocate $p_{i,c}$ to the user-level power $p_{i,c,j}$ (where j denotes a user terminal). Thus, in various embodiments, once inter-cell power allocation is performed, the local scheduler of each base station may be relied upon for scheduling the transmission of each potential transmission (methods for allocating $p_{i,c}$ and $p_{i,c,j}$ are provided in more detail further below). Stated another way, the current schedule may include allocating power levels among neighboring base stations, and may allow the local schedulers of the neighboring base stations to determine when to transmit a potential transmission.

As shown in step S210, base station 120, determines a start time for the potential transmission that is based on a channel access rate. The start time is a designated time that a potential transmission ⟨l, r, c⟩ is to transmit over a link l at a radiofrequency rate r on a carrier c. As discussed previously, the current schedule may define time frames having a start time and having a fixed duration, where one or more potential transmissions are scheduled to transmit during each time frame f. In such embodiments, the start time may be the beginning of a time frame f that is associated with the potential transmission. In some embodiments, the start time may be based on a time period between transmission attempts. In such embodiment, the start time may be the end of a time period between transmission attempts.

Referring to step S210, base station 120 determines a channel access rate λ that is associated with the potential transmission ⟨l, r, c⟩. The channel access rate λ may be a rate at which a base station determines whether the shared channel is occupied. In some embodiments, the channel access rate λ may be a random number drawn from an exponential distribution. In such embodiments, the time period between transmission attempts may be the inverse of the channel access rate (i.e., 1/λ). In various embodiments, the time period between transmission attempts (1/λ) may be set large enough so that two user terminals do not attempt to transmit during the same time slot. In the event that this does happen, it can be assumed that both conflicting transmissions cease.

As shown in step S215, base station 120 determines feasibility for a potential transmission. A schedule is feasible if every user terminal can transmit over a link at a rate on a carrier at a certain power allocation simultaneously. Thus, a potential transmission is not feasible if one or more other downlink transmissions are scheduled to transmit at the rate on the carrier at the certain power allocation. Additionally, a potential transmission is infeasible if one or more other downlink transmissions from one or more other base stations are deemed to be a source of interference with the potential transmission.

In accordance with an example embodiment, the MMUO method provides utility optimization. In particular, for a given concave utility function U (e.g., $U(x)=\log(x)$) the aggregate utility over all links l at a rate r on a given carrier c is maximized. For each link, the utility function may be applied to the total rate on the link over all carriers. Utility optimization may be calculated as follows:

$$\max f_1(\vec{\gamma}) = \Sigma_{l \in L} U(\Sigma_c \gamma_{l,c})$$

$$s.t. \ \gamma_{l,c} \leq \Sigma_{m \in Nc} r_{l,m} \pi_m \forall l, c$$

$$\Sigma_{m \in Nc} \pi_m = 1 \forall c \quad (1)$$

In the above equation, a schedule in is an element of Nc (denoted as m∈Nc) where Nc is the set of feasible schedules on a carrier c. $\gamma_{l,c}$ represents a user terminal's throughput via link l on carrier c (notations such as $\vec{\gamma}$ indicate a vector $(\gamma_{l,c}) \in l, c \in C$. If $\pi_m \in [0, 1]$ indicates the fraction of time that m occurs and $r_{l,m}$ indicates the transmission rate on link l under schedule m, then $\gamma_{l,c}$ can be viewed as a weighted sum of $r_{l,m}$ where $\pi_m$ serves as the weight.

According to one example embodiment, determining feasibility may include comparing the potential transmission against the current schedule. In various embodiments, base station 120 checks whether the potential transmission leads to a valid schedule in Nc at a start time. For example, base station 120 may determine that another transmission is scheduled to transmit on the same carrier at the same rate during the same time frame and at a certain power level.

Referring to step S220, if the potential transmission leads to a valid schedule, then the potential transmission is determined to be feasible, and a transmission duration based on an expected transmission duration μ is determined at step S225. Step S225 and subsequent steps S230-S235 will be described in detail below. If the potential transmission does not lead to a valid schedule, then the potential transmission is determined to not be feasible (or infeasible), and a transmission queue size parameter and service count is accessed and updated, as shown at step S240. This and step S245 will be described in detail below. An invalid schedule includes the situation in which the link l conflicts with itself, such that link l is already scheduled to transmit on carrier c at the start time, or link l conflicts with another link on c. In various embodiments, the MMUO method operates in a continuous manner. One of ordinary skill in the art will appreciate that, in such embodiments, it is highly unlikely that two links will make a scheduling decision simultaneously and therefore it is highly unlikely that a conflicting decision will be made.

In various embodiments, such as where two or more neighboring cells are involved, the feasibility determination at step S210 may include "sensing" downlink transmissions from one or more other base stations and deciding if the downlink transmission from the other base station(s) will be a source of interference with a potential transmission. As discussed elsewhere, interference may arise when a downlink transmission from one or more base stations are scheduled to transmit on the same carrier at the same rate during the same time frame and at a certain power level.

In such embodiments, the two or more neighboring cells may be a heterogeneous network with distributed components (e.g., a macrocell with one or more neighboring or overlapping femtocells). Macrocells typically have a much higher maximum transmit power than femtocells, since macrocells provide wide-area coverage, whereas femtocells (which may be privately owned) provide focused coverage in one specific location (e.g. a house or apartment). At any time instant mobile terminals may associate with the base station servicing the macrocell because macrocells typically accept an association with any mobile user. A femtocell however may be in CSG mode and only accept an association with a small subset of mobile terminals.

It should be noted that femtocells may have two notable effects that are departures from traditional cellular networks. First, a femtocell may create strong interference to a macrocell from within the macrocell itself, whereas in a macro-only network, interference to a cell mostly comes from outside that cell. Second, a mobile terminal may not be able to associate with the base station with the strongest signal if the base station is a femtocell in CSG mode and the user terminal does not have permission to associate with the femtocell.

For example, a base station i may have a set of associated user terminals $U_i$. The maximum transmit power $p_i$ for base station i may be a fixed amount that is distributed among a set of carriers c and among the user terminals in $U_i$, where $p_{i,c}$ is the power allocation of $p_i$ on carrier c. The current schedule may be configured to allocate $p_{i,c}$ to a next scheduled user terminal. Thus, interference may arise when a downlink transmission from one or more base stations are scheduled to transmit on the same carrier during the same time frame and at a power level that is within a certain range of $p_{i,c}$. In such instances, a channel quality information or indication (CQI) value may be used to determine whether interference is likely to occur between a potential transmission and a downlink transmission from another base station.

Power settings and transmission rates are related through a CQI. The CQI may be a value representing a measure of channel quality for a given channel. A CQI for a channel can be computed by making use of performance metric, such as a signal-to-noise ratio (SNR), signal-to-interference plus noise ratio (SINR), signal-to-noise plus distortion ratio (SNDR), and/or other like performance metrics. The CQI may also be based on other factors, such as performance impairments, channel estimation error, interference, and other like factors. These performance metrics and other factors can be measured for a given channel and then used to compute a CQI for the channel.

During a time slot t, the values of a CQI for a given carrier c and link l (denoted as $CQI_{c,l}$) are reported to base station i. The transmission rate along link l on carrier c during time slot t (denoted as $r_{c,l}(t)$) and $CQI_{c,l}$ may be calculated as follows:

$$r_{c,l}(t) = \omega_c \cdot F(p_{i,c,j}(t) \cdot CQI_{c,l}(t)) \qquad (2)$$

$$CQI_{c,l}(t) = g_{ijc}(t)/(n_c + \Sigma_{i' \neq i} p_{i'c} g_{i'jc}(t)) \qquad (3)$$

In (3), $g_{ijc}$ represents the path loss between i and j on carrier c, and $n_c$ is the background noise on c. Both $g_{ijc}$ and $n_c$ depend on c since radio propagation conditions and background interference may be different on different frequencies. The product of $p_{i,c,j}$ and $CQI_{c,l}$ is the SINR. Therefore, $CQI_{c,l}$ may be thought of as a SINR unit for power transmission. In (2), $\omega_c$ is the bandwidth of carrier c and $F(\cdot)$ represents spectral efficiency as a function of SINR. For example $F(\cdot)$ could be a suitably discretized version of the Shannon function log(1+x).

In LTE systems, each base station in an LTE network may have its own local scheduler for user-level power allocation. When dealing with neighboring cells, scheduling may occur at an inter-cell level, where the primary scheduling decision is to determine the power levels $p_{i,c}$ (which is sometimes known as inter-cell interference coordination (ICIC)). The secondary scheduling decision is to allocate $p_{i,c}$ to the user-level power (denoted as $p_{i,c,j}$ where j denotes a user terminal). In other words, once inter-cell power allocation is performed, the local scheduler of each base station is relied upon for scheduling the transmission of each potential transmission. Therefore, determining feasibility at step S215 may include using a CQI value to indicate whether interference is likely to occur at a given transmission rate.

In addition to determining if interference is likely to occur, determining feasibility at step S215 may include base station power allocation. In such embodiments, base station 120 may be configured to specify the transmission rate $r_{c,l}(t)$ for every potential transmission ⟨l, r, c⟩ that takes place during a time slot t. To obtain power settings necessary to carry out the potential transmission ⟨l, r, c⟩ (i.e., $p_{i,c}$), equation (2) provides the direct translation from transmission rates to power levels. $p_{i,c}$ can also be calculated as follows:

$$p_{i,c,j}(t) = F^{-1}(r_{c,l}(t)/\omega_c)/CQI_{c,l}(t) \qquad (4)$$

For a given base station i and carrier c, one user terminal $j \in U_i$ may have a positive power allocation $p_{i,c,j}(t)$. Let $p_{i,c}(t) = p_{i,c,j}(t)$ for user terminal j. The transmission may then take place as long as the aggregate transmission power for all carriers c is less than the maximum transmit power of the base station i.

However, in many embodiments where two or more neighboring heterogeneous networks are involved, only the transmit power of a base station for a carrier (i.e., $p_{i,c}$) may be specified because the user-level power is determined by a local scheduler. In such embodiments, the current schedule may be configured to compute the $p_{i,c}$ values and then the local scheduler determines which associated user terminals in $U_i$ receives the transmission power $p_{i,c}$ using the local scheduling algorithm. It should be noted that once the power levels are set, then whichever user terminal is chosen to transmit by local scheduler does not affect the interference experienced in other cells.

Therefore, once power levels are set, base station 120 "senses" if a downlink transmission from one or more base stations are scheduled to transmit on the same carrier during the same time frame and at a power level that is within a certain range of $p_{i,c}$. This is because, as discussed elsewhere, interference may arise when a downlink transmission from one or more base stations are scheduled to transmit on the same carrier during the same time frame and at a power level that is within a certain range of $p_{i,c}$. Accordingly, in order to "sense" a downlink transmission from other base stations, a base station may be configured to "overhear" downlink transmissions from other base stations.

In various embodiments, an activity indicator (y) may be reported to a base station in addition to the CQI. The activity indicator may be a binary number, where the activity indicator is set to one (y=1) when a transmission ⟨l, r, c⟩ is made during time slot t. The activity indicator is reported along with the CQI if the activity indicator is set to one. Each base station i decodes all the CQI values that it can receive, not only the CQI values for user terminals associated with base station i. If base station i determines that a CQI includes an activity indicator for another user terminal transmitting on carrier c, then every potential transmission ⟨l, r, c⟩ is declared infeasible.

However, in some embodiments, a safety margin may be defined for each activity indicator. The safety margin may be the ratio between the currently achievable transmission rate and the actual rate that is used by base station i. This achievable rate can be computed from the $CQI_{c,l}(t)$ values together with the current power levels. The safety margins may be transmitted on the CQI channel along with the activity indicators. The activity indicator can be "safe" if the safety margin is above a specified maximum threshold value (e.g., a first threshold), "vulnerable" if the margin is between the maximum threshold value and a minimum threshold value (e.g., between the first threshold and second threshold), and "in outage" if the margin is below the minimum threshold value (e.g., the second threshold). It should be noted that if the margin is "in outage" then a user terminal should not be able to receive data at rate r for the current CQI values. In such embodiments, base station i may refrain from declaring a potential transmission on carrier c infeasible, even if it overhears an activity indicator, so long as the activity indicator is in a safe range. In some embodiments, the exact value of the maximum and minimum thresholds may be a network-wide configured parameter. In alternate embodiments, each base station may estimate each threshold value by lowering its estimate until it observes links going into outage.

Furthermore, overhearing downlink transmissions from other base stations may involve probing. In such embodiments, whenever base station i needs to decide if a potential transmission $\langle l, r, c \rangle$ could transmit on l, r, and c, it briefly sets power level $p_{i,c}$ on carrier c and observes the effects on other user terminals. As discussed elsewhere, $p_{i,c}$ is the power necessary to carry out the potential transmission $\langle l, r, c \rangle$ and can be calculated as in equation (4). If basestation i overhears any activity indicators moving into outage, then it sets $p_{i,c}$ to 0 and declares the potential transmission $\langle l, r, c \rangle$ infeasible.

One potential drawback to using a probe is that it could send neighboring user terminals into outage for short periods, which would need to be rectified by more robust channel coding on the data channels. However, it has the advantage that base station i gets a much better sense of the interference that might be caused by setting a particular power level $p_{i,c}$ on carrier c.

In alternate embodiments, instead of base stations overhearing activity indicators and their associated safety status, each base station may directly communicate their own activity indicators and safety margins to all their neighboring base stations. This may be done, for example, using LTE's X2 channel that provides communication between neighboring base stations.

Referring again to step S220, if the potential transmission $\langle l, r, c \rangle$ is feasible, then base station 120 proceeds to step S225 to determine a transmission duration based on an expected transmission duration.

As shown in step S225, a transmission duration is determined based on the expected transmission duration $\mu$. The transmission duration is a period during which the potential transmission transmits. The transmission duration may last for an exponentially distributed time period with a mean equal to the expected transmission duration $\mu$. In such embodiments, base station 120 determines an expected transmission duration $\mu$ that is associated with the potential transmission $\langle l, r, c \rangle$. The expected transmission duration $\mu$ may be an estimated amount of time that a data transmission is predicted to occur. In some embodiments, the expected transmission duration $\mu$ may be a random number drawn from an exponential distribution. Then at step S230, a message is sent to the user terminal, which directs the user terminal to start transmitting immediately during the transmission duration.

As shown in step S235, base station 120 updates the current schedule with the potential transmission. In various embodiments, the current schedule may be updated according to the scheduling algorithm being employed by base station 120, as described above.

After step S235, or if the potential transmission $\langle l, r, c \rangle$ is not feasible, then as shown in step S240, base station 120 accesses and updates a transmission queue size parameter and a service count. In various embodiments, base station 120 may receive and store information regarding a user terminal's service and transmission queue independent of the scheduling algorithm. In such embodiments, a user terminal may calculate the service it received during a transmission (denoted as $S_l[f]$) and may update a transmission queue size parameter (denoted as $q_l[f]$). The transmission queue size parameter may be a number based on a transmission queue size associated with a user terminal. The transmission queue size parameter may be updated according to the follow equation:

$$q_l[f+1] = [q_l[f] + b[f] \cdot (U^{r-1}(q_l[f]/V) - S_l[f])]_{q_{min}}^{q_{max}} \quad (5)$$

In the above equation, b is a step size function, and q max and q min are bounds on the transmission queue size. Additionally, the positive parameter V controls the accuracy of the algorithm.

As shown in step S245, base station 120 updates the channel access rate $\lambda$ and the expected transmission duration $\mu$ based in part on the transmission rate of the potential transmission, the received transmission queue size, and the received service count. During each time frame f, the channel access rate $\lambda$ and an expected transmission duration $\mu$ associated with the potential transmission $\langle l, r, c \rangle$ (denoted as $\lambda_{l,r,c}[f]$ and $\mu_{l,r,c}[f]$, respectively) remain unchanged. At the end of each time frame f, the channel access rate $\lambda$ and an expected transmission duration $\mu$ are updated for the next potential transmission to be scheduled. The channel access rate $\lambda$ and an expected transmission duration $\mu$ may be updated according to the following equation:

$$\lambda_{l,r,c}[f+1] \cdot \mu_{l,r,c}[f+1] = \exp(r \cdot q_l[f+1]) \quad (6)$$

In the above equation, $\lambda_{l,r,c}[f+1]$ is the updated channel access rate, $\mu_{l,r,c}[f+1]$ is the expected transmission duration, $q_l[f+1]$ is the updated queue size parameter calculated by equation (5), and r is the transmission rate.

As will be appreciated, the method and apparatus according the example embodiments has several advantages. First, the example embodiments allow multiple transmissions to occur at multiple transmission rates on multiple carriers, such that utility optimization is achieved. Second, the example embodiments allow for easy implementation because the local schedulers being used by the base stations are utilized. Third, the example embodiments utilize the existing CQI-based technology, and hence additional signaling is minimal.

The invention being thus described, it will be obvious that the same may be varied in many ways. Such variations are not to be regarded as a departure from the invention, and all such modifications are intended to be included within the scope of the present invention.

We claim:

1. A method of scheduling user terminal transmissions by a base station, the method comprising:
   determining, by the base station, feasibility for a potential transmission based on a current schedule of active transmissions, the current schedule of active transmissions including active transmissions over multiple carriers and at multiple transmission rates, the potential transmission being at a start time on a radio frequency carrier at a data transmission rate by a user terminal, the determining the feasibility including,
   determining, by the base station, whether at least one other downlink transmission from at least one other base station is not deemed to be a source of interference with the potential transmission, wherein the potential transmission is determined to be feasible when at least one other downlink transmission from at least one other base station is not deemed to be a source of interference with the potential transmission;
   determining, by the base station, a transmission duration if the potential transmission is determined to be feasible;
   sending, by the base station, a message to the user terminal, the message directing the user terminal to receive the potential transmission on the radio frequency carrier at the data transmission rate at the start time when the potential transmission is determined to be feasible, the message directing the user terminal to not receive the potential transmission on the radio frequency carrier at the data transmission rate at the start time when the potential transmission is determined to be infeasible; and updating, by the base station, the current schedule according to the feasibility determined.

2. The method of claim 1, wherein determining feasibility comprises:

sensing, by the base station, the at least one other downlink transmission from the at least one other base station;

deciding, by the base station based on the sensing, whether the at least one other downlink transmission from the at least one other base station will be a source of interference with the potential transmission; and determining, by the base station, that the potential transmission is infeasible when the deciding decides that the at least one other downlink transmission from the at least one other base station will be a source of interference with the potential transmission.

3. The method of claim 2, wherein the deciding decides that the at least one other downlink transmission from the at least one other base station is a source of interference when, (i) the at least one other downlink transmission from the at least one other base station is scheduled to transmit on a same radio frequency carrier during a same time frame as the potential transmission, and (ii) an estimate based on a channel quality information (CQI) value indicates that an expected interference will exceed a threshold.

4. A method of scheduling user terminal transmissions by a base station, the method comprising:

determining, by the base station, feasibility for a potential transmission based on a current schedule of active transmissions, the current schedule of active transmissions including active transmissions over multiple carriers and at multiple transmission rates, the potential transmission being at a start time on a radio frequency carrier at a data transmission rate by a user terminal, and the determining the feasibility includes, sensing, by the base station, at least one downlink transmission from at least one other base station, the sensing including, transmitting, by the base station, a probe at a desired power level for the potential transmission to the user terminal, and, receiving, by the base station, information from neighboring cells that is indicative of interference caused by the probe, deciding, by the base station, whether the at least one downlink transmission from the at least one other base station will be a source of interference with the potential transmission based on at least one of, (i) whether the information received from the sensing indicates that the interference caused by the probe exceeds a threshold, (ii) whether the at least one downlink transmission from the at least one other base station is scheduled to transmit on the radio frequency carrier and the time frame of the potential transmission, and (iii) an estimate based on a channel quality information (CQI) value indicates that an expected interference will exceed the threshold, determining, by the base station, that the potential transmission is infeasible when the deciding decides that the at least one downlink transmission from the at least one other base station will be a source of interference with the potential transmission;

determining, by the base station, a transmission duration when the potential transmission is determined to be feasible;

sending, by the base station, a message to the user, the message directing the user terminal to receive the potential transmission on the radio frequency carrier at the data transmission rate at the start time when the potential transmission is determined to be feasible, the message directing the user terminal to not receive the potential transmission on the radio frequency carrier at the data transmission rate at the start time when the potential transmission is determined to be infeasible; and updating, by the base station, the current schedule according to the feasibility determined.

5. The method of claim 4, wherein the desired power level is a transmission power required to transmit the potential transmission, the required transmission power being based on the data transmission rate of the potential transmission and the CQI value.

6. A method of scheduling user terminal transmissions by a base station, the method comprising:

determining, by the base station, feasibility for a potential transmission based on a current schedule of active transmissions, the current schedule of active transmissions including active transmissions over multiple carriers and at multiple transmission rates, the potential transmission being at a start time on a radio frequency carrier at a data transmission rate by a user terminal;

determining, by the base station, a transmission duration when the potential transmission is determined to be feasible, wherein the start time is based on a channel access rate and the transmission duration is based on an expected transmission duration;

sending, by the base station, a message to the user terminal, the message directing the user terminal to receive the potential transmission on the radio frequency carrier at the data transmission rate at the start time when the potential transmission is determined to be feasible, the message directing the user terminal to not receive the potential transmission on the radio frequency carrier at the data transmission rate at the start time when the potential transmission is determined to be infeasible; and updating, by the base station, the current schedule according to the feasibility determined.

7. The method of claim 6, further comprising:

determining, by the base station, the channel access rate by choosing a random number from an exponential distribution with a mean equal to the channel access rate; and determining, by the base station, the transmission duration by choosing a random number from an exponential distribution with a mean equal to an inverse of the expected transmission duration.

8. The method of claim 7, wherein updating the current schedule comprises:

accessing, by the base station, a transmission queue size parameter and a service count, the service count indicating a service received by the user terminal; and updating, by the base station, the channel access rate and the expected transmission duration based in part on the transmission rate of the potential transmission, the transmission queue size parameter, and the service count.

9. A base station including a processor and an associated memory, the processor configured to:
- determine feasibility for a potential transmission according to a request based on a current schedule of active transmissions over multiple carriers and at multiple transmission rates, the potential transmission having at a start time on a radio frequency carrier at a data transmission rate by a user terminal, in the determining the feasibility the processor is configured to,
  - determine whether at least one other downlink transmission from at least one other base station is not deemed to be a source of interference with the potential transmission, wherein the potential transmission is determined to be feasible when at least one other downlink transmission from at least one other base station is not deemed to be a source of interference with the potential transmission;
- determine a transmission duration when the potential transmission is determined to be feasible;
- send a message to the user terminal,
  - the message directing the user terminal to receive the potential transmission on the radio frequency carrier at the data transmission rate at the start time when the potential transmission is determined to be feasible,
  - the message directing the user terminal to not receive the potential transmission on the radio frequency carrier at the data transmission rate at the start time when the potential transmission is determined to be infeasible; and
- update the current schedule according to the feasibility determined.

10. The base station of claim 9, wherein in the determining the feasibility, the processor of the base station is configured to:
- sense the at least one other downlink transmissions from the at least one other base station;
- decide, based on the sensing, when the at least one other downlink transmission from the at least one other base station will be a source of interference with the potential transmission; and
- determine that the potential transmission is infeasible when the deciding decides that the at least one other downlink transmission from the at least one other base station will be a source of interference with the potential transmission.

11. The base station of claim 10, wherein the processor is configured to decide that the at least one other downlink transmission from the at least one other base station is a source of interference if when
  (i) the at least one other downlink transmission from the at least one other base station is scheduled to transmit on a same radio frequency carrier during a same time frame as the potential transmission, and
  (ii) an estimate based on a channel quality information (CQI) value indicates that an expected interference will exceed a threshold.

12. A base station comprising a processor and an associated memory, the processor configured to:
- determine feasibility for a potential transmission according to a request based on a current schedule of active transmissions, the current schedule of active transmissions including active transmissions over multiple carriers and at multiple transmission rates, the potential transmission being at a start time on a radio frequency carrier at a data transmission rate by a user terminal, and in the determining the feasibility, the base station is configured to,
  - sense downlink transmissions from at least one other base station, and in the sensing the processor is configured to,
    - transmit a probe at a desired power level for the potential transmission to the user terminal, and
    - receive information from neighboring cells that is indicative of interference caused by the probe,
  - decide whether the at least one downlink transmission from the at least one other base station will be a source of interference with the potential transmission based on at least one of,
    (i) whether the information received from the sensing indicates that the interference caused by the probe exceeds a threshold,
    (ii) whether the at least one downlink transmission from the at least one other base station is scheduled to transmit on the radio frequency carrier and the time frame of the potential transmission, and
    (iii) an estimate based on a channel quality information (CQI) value indicates that an expected interference will exceed the threshold,
  - determine that the potential transmission is infeasible when the deciding decides that the at least one downlink transmission from the at least one other base station will be a source of interference with the potential transmission;
- determine a transmission duration when the potential transmission is determined to be feasible;
- send a message to the user terminal,
  - the message directing the user terminal to receive the potential transmission on the radio frequency carrier at the data transmission rate at the start time when the potential transmission is determined to be feasible,
  - the message directing the user terminal to not receive the potential transmission on the radio frequency carrier at the data transmission rate at the start time when the potential transmission is determined to be infeasible; and
- update the current schedule according to the feasibility determined.

13. The base station of claim 12, wherein the desired power level is a transmission power required to transmit the potential transmission, the required transmission power being based on the data transmission rate of the potential transmission and the CQI value.

14. A base station comprising a processor and an associated memory, the processor configured to:
- determine feasibility for a potential transmission according to a request based on a current schedule of active transmissions, the current schedule of active transmissions including active transmissions over multiple carriers and at multiple transmission rates, the potential transmission being at a start time on a radio frequency carrier at a data transmission rate by a user terminal;
- determine a transmission duration when the potential transmission is determined to be feasible, wherein the start time is based on a channel access rate and the transmission duration is based on an expected transmission duration;
- send a message to the user,
  - the message directing the user terminal to receive the potential transmission on the radio frequency carrier at the data transmission rate at the start time when the potential transmission is determined to be feasible,
  - the message directing the user terminal to not receive the potential transmission on the radio frequency carrier at the data transmission rate at the start time when the potential transmission is determined to be infeasible; and update the current schedule according to the feasibility determination.

15. The base station of claim 14, wherein the processor is configured to:

determine the channel access rate by choosing a random number from an exponential distribution with a mean equal to the channel access rate; and determine the transmission duration by choosing a random number from an exponential distribution with a mean equal to an inverse of the expected transmission duration.

16. The base station of claim 15, wherein, in the updating the current schedule, the processor of the base station is configured to:

access a transmission queue size parameter and a service count, the service count indicating a service received by the user terminal; and update the channel access rate and the expected transmission duration based in part on the transmission rate of the potential transmission, the transmission queue size parameter, and the service count.

* * * * *